J. A. CARSON.
SYSTEM FOR PRODUCING VOLATILE GASES.
APPLICATION FILED JUNE 1, 1918.
1,286,528.
Patented Dec. 3, 1918.
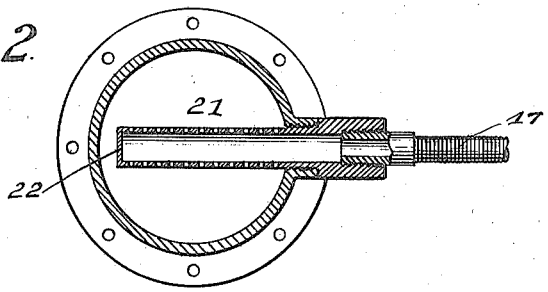
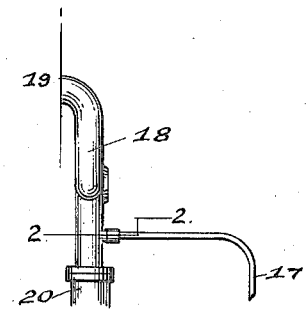
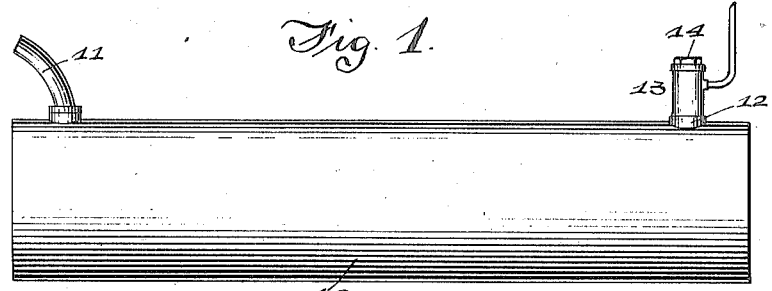
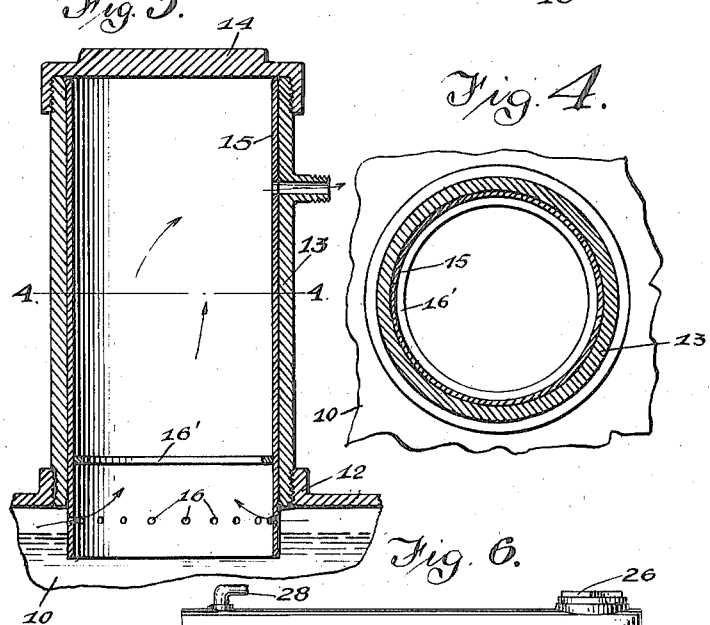
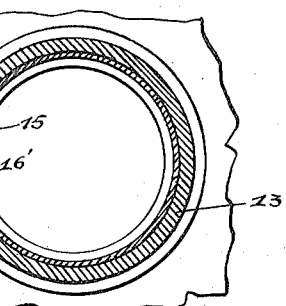
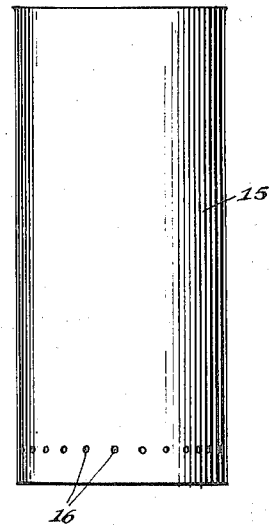
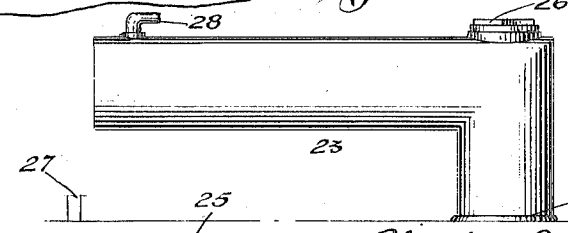
INVENTOR
John A. Carson
BY
Victor J. Evans ATTORNEY

UNITED STATES PATENT OFFICE.

JOHN A. CARSON, OF HUNTINGTON, NEW YORK.

SYSTEM FOR PRODUCING VOLATILE GASES.

1,286,528.   Specification of Letters Patent.   Patented Dec. 3, 1918.

Application filed June 1, 1918. Serial No. 237,825.

*To all whom it may concern:*

Be it known that I, JOHN A. CARSON, a citizen of the United States, residing at Huntington, in the county of Suffolk and State of New York, have invented new and useful Improvements in Systems for Producing Volatile Gases, of which the following is a specification.

This invention relates to the class of internal combustion engines and more particularly to a device for utilizing those waste volatile vapors which are given off from the liquid fuel in the supply sources of such engines; combining the same with atmospheric air; conducting the mixture thus combined to the intake end of the engine by induced suction and then using the same as a highly volatile explosive mixture in the driving of the engine.

While my invention is generally applicable to those types of engines employing carbureters and the like for mixing air and fuel and delivering the same to the intake or manifold of the engine, I would have it expressly understood that I in no wise, limit myself to such specific application or embodiment of my invention, which I have selected merely as a basis for illustrating and describing the invention to render a clear and comprehensive understanding of the scope and novel features thereof.

My invention broadly comprehends the provision of a device for utilizing the waste vapors which rise to a point above the surface of the fuel in the fuel supply tank of an internal combustion engine; admitting atmospheric air to the presence of such vapors and then drawing the same therethrough by induced suction and delivering the same in a volatile state to the firing chamber or intake manifold of the engine where it may be used as a motive agent.

I find that when my invention is used in conjunction with an internal combustion engine wherein is incorporated a carbureter, a material saving of fuel is effected; that a greater measure of efficiency is resultant and greater power obtained.

In the drawings:—

Figure 1 is a side view conventionally illustrating the application of the invention to the intake of an internal combustion engine.

Fig. 2 is a section taken on the line 2—2 of Fig. 1.

Fig. 3 is a vertical section through the air chamber and through a portion of the fuel chamber.

Fig. 4 is a section on line 4—4 of Fig. 3.

Fig. 5 is a side view of the inner shell of the air chamber.

Fig. 6 is a side view of a slightly modified form of air chamber and portion of the fuel tank.

In carrying the invention into practice, use is made of a fuel tank 10 which is adapted to contain gasolene or other volatile agent. It is provided with an air intake tube 11 at one end by means of which atmospheric air can be taken into the vapor stratum of the fuel supply tank, while at the opposite end is an outlet collar 12 to which an air chamber 13 is connected. The upper end of the air chamber is closed by a removable filler cap 14.

Within the air chamber is a shell 15 whose lower end is extended below the bottom of the chamber in order that it will project for some appreciable distance into the tank 10. The said shell is provided with suitable perforations 16 by means of which the volatile vapor as it is given off from the body of liquid fuel can find its escape into said chamber. By extending the shell below the chamber and into the tank 10, I find that the liquid in the tank is held from spashing into the chamber. At a point directly above the mentioned perforations, the shell is provided with an internal annular bead 16', which acts as an obstruction to prevent that liquid which rises by capillary attraction upon the inner walls of the shell from passing beyond the obstruction. It is found that the liquid when coming in contact with said obstruction condenses and freely passes back to the tank. In this manner, the heavy particles of liquid are held against passing directly from the chamber.

In such forms of tanks as that above described there is always commonly present therein, a vaporous stratum above the level of the fuel and it is through this vaporous mass that I propose conveying atmospheric air and saturating such air whereby it may be utilized as a volatile explosive agent for the operation of internal combustion engines. In order to encourage such circulation of atmospheric air through the volatile vapors, I provide a conducting tube 17 between the chamber 13 and the intake end of manifold of the engine, said manifold being illustrated at 18 and connected in the usual manner with the engine 19 and carbureter 20. The said conducting tube 17 opens directly into said shell 15 as shown in Fig. 3. I do not desire to lay any particular emphasis on the use of my invention in combination with a carbureter but desire to place considerable stress upon the saturating of atmospheric air with a volatile waste vapor and then conveying the same for any preferred utilization in the driving of internal combustion engines. It will be manifest, incident to the arrangement described that by opening the conducting tube 17 to the manifold that the saturated atmospheric air will be drawn into the inlet end of the motor by induced suction.

In order to prevent back firing, I find it desirable to provide the manifold with a distributer 21 which is connected directly with the conducting tube 17. The distributer is in the form of a foraminated tube which is closed at one end, as shown at 22. I find that this arrangement allows for an ample distribution of saturated atmospheric air to the intake of the cylinder and yet it positively prevents ignition of the fuel in the supply tank by back firing.

I prefer to employ a chamber such as that shown at 13 in which the atmospheric air after being properly saturated can be concentrated for subsequent discharge to the tube 17.

In some instances, it may be desirable to increase the proportion of the air chamber and with such in mind, the form of chamber illustrated at 23 in Fig. 6 can be used. This chamber is substantially of L shaped formation and is connected at 24 to the fuel tank 25. The air chamber is provided with a filler cap 26 by means of which fuel can be introduced to the tank 25. In this form, the tank 25 is provided with an air inlet 27, while at 28 above the long branch of the chamber 23, is an outlet connection from which the atmospheric air after being treated to the action of the volatile vapors can be discharged to the inlet of the engine.

What is claimed as new is:—

1. In a tank for holding liquid fuel having an air inlet therein, a mixture outlet structure comprising a casing connected within an opening formed in the top of the tank, the top of said casing being closed and its lower end extending into the tank, said inwardly extending end of said casing being provided with an annular series of perforations, and an outlet pipe connected and communicating with the upper portion of said casing.

2. In a tank for holding liquid fuel having an air inlet therein, a mixture outlet structure comprising a casing connected within an opening formed in the top of the tank, a nipple formed on one side of said casing and provided with a bore communicating with the interior thereof, a cap forming a closure for the top of said casing, a cylindrical shell disposed within said casing and provided with a hole registering with the bore of said nipple, the lower end of said shell extending into the fuel tank and having its inwardly projecting end provided with an annular series of perforations, an inwardly extending bead within the lower portion of said shell and above said perforations, and an outlet pipe connected with said nipple.

In testimony whereof I, affix my signature.

JOHN A. CARSON.